US006463656B1

(12) United States Patent
Debesis et al.

(10) Patent No.: US 6,463,656 B1
(45) Date of Patent: Oct. 15, 2002

(54) LAMINATE AND GASKET MANFOLD FOR INK JET DELIVERY SYSTEMS AND SIMILAR DEVICES

(75) Inventors: John R. Debesis, Penfield; Larry L. Lapa, Rochester; Edwin A. Mycek, Scottsville, all of NY (US)

(73) Assignee: Eastman Kodak Company, Rochester, NY (US)

( * ) Notice: Subject to any disclaimer, the term of this patent is extended or adjusted under 35 U.S.C. 154(b) by 188 days.

(21) Appl. No.: 09/606,293

(22) Filed: Jun. 29, 2000

(51) Int. Cl.[7] .................................................. B23P 17/00

(52) U.S. Cl. ........................... 29/890.1; 29/825; 29/846

(58) Field of Search ................................ 29/890.1, 825, 29/831, 846, 847, 851, 852; 347/47

(56) References Cited

U.S. PATENT DOCUMENTS

| | | | | |
|---|---|---|---|---|
| 4,347,522 A | * | 8/1982 | Bahl et al. | 346/75 |
| 5,087,930 A | | 2/1992 | Roy et al. | |
| 5,132,707 A | | 7/1992 | O'Neill | |
| 5,563,643 A | | 10/1996 | Carlotta et al. | |
| 5,610,645 A | | 3/1997 | Moore et al. | |
| 5,665,249 A | | 9/1997 | Burke et al. | |
| 5,677,718 A | | 10/1997 | Crawford et al. | |
| 5,821,959 A | * | 10/1998 | Murakami et al. | 347/47 |
| 5,821,966 A | | 10/1998 | Schell et al. | |
| 5,867,189 A | | 2/1999 | Whitlow et al. | |

FOREIGN PATENT DOCUMENTS

| | | |
|---|---|---|
| EP | 0 178 596 A2 | 4/1986 |
| EP | 0 357 020 A2 | 3/1990 |
| EP | 0 782 923 A1 | 7/1997 |
| EP | 0 829 357 A1 | 3/1998 |
| GB | 2 302 842 A | 2/1997 |

* cited by examiner

*Primary Examiner*—Gregory Huson
*Assistant Examiner*—Peter deVore
(74) *Attorney, Agent, or Firm*—Norman Rushefsky

(57) ABSTRACT

A system and method for the fabrication of a fluid, gas and/or vacuum flow system (10) having a laminate gasket manifold (14) containing a plurality of bi-directional fluid-flow channels (22) therein. Initially, a photoimagable polyimide dry film resist layer (44) is applied to one or more stiffening elements (46) in order to form laminate sub-layers (42). The resist is then patterned to form a plurality of openings therein. Selectively, the laminate sub-layers are etched to form alignment apertures (18) therein. The resist-coated sub-layers (42) are then stacked such that the alignment apertures (18) therein are aligned to each other, respectively, to form bi-directional fluid-flow channels (22). Heat and pressure are then applied to the stack of laminate sub-layers (42) at 70–75 degrees C. in a vacuum laminator for 10 to 30 seconds. Additional parts, such as a silicon aperture structure (12) and a substrate, or mounting block (24), are bonded to the laminate gasket manifold (14) via a die bonder at 160 degrees C. for approximately five minutes. If such additional parts are added, forming a system (10), then the system (10) is cured via a post bake at 160 degrees C. for one hour utilizing a static pressure, such as a dead weight, in order to press all parts together. Thus, the post bake results in a complete cross-link of the bonding material (44), and may be applied to the laminate gasket manifold (14) should additional parts not be added.

13 Claims, 3 Drawing Sheets

LAMINATE AND GASKET MANFOLD FOR INK JET DELIVERY SYSTEMS AND SIMILAR DEVICES

FIELD OF THE INVENTION

This invention relates in general to a fluid, gas and/or vacuum flow system, and to a method for the fabrication and/or formation of same. More particularly, the invention relates to a method for the fabrication of a bi-directional flow system suitable for use in the delivery of ink in an ink jet printer, for example, and to such a system having a laminate gasket manifold with a plurality of fluid-flow channels therein.

BACKGROUND OF THE INVENTION

Without limiting the scope of the invention, its background is described in connection with ink jet printers, as an example. It should be understood that the solutions provided herein in connection with an ink flow system for use in an ink jet printer may have use in other applications, such as where vacuum is required.

Modem color printing relies heavily on ink jet printing techniques. The term "ink jet" as utilized herein is intended to include all drop-on-demand or continuous ink jet printer systems including, but not limited to, thermal ink jet, piezoelectric, and continuous, which are well known in the printing industry. An ink jet printer produces images on a receiver medium (such as paper) by ejecting ink droplets onto a receiver medium, such as paper, in an image-wise fashion. The advantages of non-impact, low-noise, low-energy use, and low cost operations, in addition to the capability of the printer to print on plain paper, are largely responsible for the wide acceptance of ink jet printers in the marketplace.

The print head is the device that is most commonly used to direct the ink droplets onto the receiver medium. A print head typically includes an ink reservoir and channels which carry the ink from the reservoir to one or more nozzles. Typically, sophisticated print head systems utilize multiple nozzles for applications such as four-color ink jet and high speed continuous ink jet printer systems, as examples. In order to fabricate a four-color ink jet print head that consists of one monolithic silicon die with one or more arrays of nozzles for each color, an ink manifold is often used in the fluid delivery system.

Ink manifolds are typically formed of a number of laminate sub-layers stacked on top of each other to form a sub-assembly having internal fluid flow channels. Various lamination techniques are known including stamping, laser machining, or chemical etching, to produce the channels in sheets of steel or plastics which are then adhesively bonded together to form the manifold sub-assembly. A known problem with these prior art lamination methods occurs with the use of liquid adhesives or epoxies. Such adhesives can spill into the channels during stamping or machining resulting in a clogged channel and poor performance of the fluid flow system. Oftentimes, the fabrication process is followed by a cleaning of the manifold sub-assembly which increases the overall costs of manufacture. If the adhesive layer is thinned out, the adhesive may not adhere to the sub-layers resulting in less than ideal bond thickness.

A pressure sensitive adhesive can also be used. For example, laminates, which are fabricated with a layer of adhesive on one or both sides, can be stacked together and bonded under heat and pressure. However, structures with only a few laminate sub-layers can collapse when pressure and heat are applied since they are quite flexible and difficult to work with. For smaller structures, the material must be patterned out by mechanical means or by laser machining. In any case, the problem remains that the adhesives are too thick and will often collapse into the channels resulting in clogging.

The ideal solution would provide clean, sharp edges along the channel walls with no clogging. Accordingly, a need exists for an improved method of fabricating a fluid, gas and/or vacuum flow system that eliminates debris in the fluid flow channels of the manifold and the requirement of cleaning the manifold sub-assembly after manufacture. A method of fabricating a general-purpose flow system, which can receive and transmit either a fluid or gas, would be useful in numerous applications. A fluid, gas and/or vacuum flow system that is cost effective to fabricate, but maintains ideal bond thickness, even for structures with a few sub-layers, would provide numerous advantages.

SUMMARY OF THE INVENTION

The present invention provides a method for the fabrication of a bi-directional fluid, gas and/or vacuum flow system. The system includes a laminate gasket manifold containing a plurality of bi-directional fluid-flow channels. With the present invention, a four-color ink jet print head, for example, that consists of one monolithic silicon die with one or more arrays of nozzles for each color can be fabricated.

Disclosed in one embodiment is a method for the fabrication of a fluid, gas and/or vacuum flow system having a laminate gasket manifold containing a plurality of bidirectional fluid-flow channels therein. The method comprises the step of applying a bonding material, such as a photoimagable polyimide dry film resist, to one or more stiffening elements in order to form laminate sub-layers. The application of the photoimagable polyimide dry film resist is performed on one or both sides of the stiffening elements, such as stainless steel, Invar or copper. As such, an image developed on both sides of each laminate sub-layer during registration is created.

The method also comprises the step of patterning the resist to form a plurality of openings therein. Openings in the dry film are patterned on both sides of the laminate sub-layers using a pre-registered or pre-aligned photomask. The pattern is then defined by removing the photoresist from the selected pattern area. As such, the stainless steel is etched from the laminate sub-layers to form alignment apertures therein. Thus, etching is performed separately on the laminate sub-layers utilizing an array format. Once the alignment apertures are formed, pins are set in the alignment apertures using a flex-mass board designed to keep the laminate sub-layers aligned.

The method further comprises the step of stacking the resist-coated sub-layers such that the alignment apertures therein are aligned to each other, respectively, to form bi-directional fluid, gas, and/or vacuum channels. Heat and pressure is then applied to the stack whereby the laminate sub-layers are bonded together to form a laminate gasket manifold. In one embodiment, the laminate gasket manifold is heated at 70 to 75 degrees C. in a vacuum laminator for 10 to 30 seconds in order to tack the laminate sub-layers together. This process results in the bonding material, or photoimagable polyimide dry film resist layers, of the laminate gasket manifold not reaching a fully cross-linked state. The laminate gasket manifold can then be placed between additional parts, such as a substrate providing fluid, gas and/or vacuum inlets, and a structure, such as an ink jet silicon aperture structure.

Together, the laminate gasket manifold and additional parts are bonded to form a fluid, gas and/or vacuum flow system. The laminate gasket manifold is first aligned with the fluid, gas and/or vacuum inlets and outlets in the substrate. The substrate may include a mounting block comprising a metal such as stainless steel, a ceramic such as zirconium oxide, or a glass such as Pyrex or quartz. The laminate gasket manifold is then aligned with the nozzles, or orifices of the silicon aperture structure. As such, a precision die bonder can be used to accurately align the structures. In using the die bonder, pressure is applied to the gasket manifold and heated at 160 degrees C. The gasket manifold is held at this temperature and pressure for approximately five minutes in order to adhere the substrate to one side of the laminate gasket manifold and the silicon aperture structure to the other side.

To fully cross-link the bonding material, a post bake, or curing process, at 160 degrees C. for one hour is used with a static pressure, such as a dead weight, that presses the flow system together during the cross-linking process. However, if the laminate gasket manifold is not to be used to bond other parts together, heating the laminate sub-assembly via a post bake under pressure at 160 degrees C. for one hour will fully cross-link the bonding material.

According to another embodiment, disclosed is a fluid, gas and/or vacuum flow system comprising a laminate gasket manifold containing a plurality of bidirectional fluid-flow channels therein. The laminate gasket manifold further comprises one or more laminate sub-layers. The laminate sub-layers each, in turn, comprise one layer including a stiffening element and one or two layers of bonding material, such as a polyimide dry film resist, which resists dissolution upon contact with the fluid. The stiffening elements are chosen from the group consisting of: stainless steel, Invar or copper. The number of laminate sub-layers is proportional to the number of different fluid-flow channel exit applications. As such, all laminate sub-layers are stacked in an aligned manner to register the alignment apertures to each another and placed in a position for bonding together.

The flow system also comprises a silicon aperture structure which forms a top layer over the laminate gasket manifold. The silicon aperture structure further includes a plurality of alignment apertures designed to constrain the fluid flow via the channels.

The flow system further comprises a means for receiving and transmitting fluid through the flow channels of the laminate gasket manifold and exit the alignment apertures of the silicon aperture structure. The means for receiving and transmitting fluid through the channels of the laminate gasket manifold is housed in a substrate, or mounting block. The mounting block comprises a metal such as stainless steel, a ceramic such as zirconium oxide, or a glass such as Pyrex or quartz. Furthermore, the means for receiving and transmitting fluid can be utilized as a vacuum for cleaning where debris or other fluids may be found.

In one specific application, the flow system discussed is utilized with an ink jet print head. Further disclosed is a fluid-flow apparatus for use with ink jet systems and similar devices comprising a laminate gasket manifold containing a plurality of bi-directional fluid-flow channels therein. The laminate gasket manifold further includes a polyimide dry film resist, which resists dissolution upon contact with ink. The laminate gasket manifold also comprises one or more laminate sub-layers etched to form the fluid-flow channels. Each laminate sub-layer comprises one layer, including a stiffening element, and one or two layers of polyimide dry film. The polyimide dry film resist is applied to one or both sides of the stiffening elements so as to form a laminate sub-layer. The stiffening elements are chosen from the group consisting of: stainless steel, Invar or copper. The laminate sub-layers are then stacked in an aligned manner to register the alignment apertures to each other for bonding and to form fluid-flow channel exit applications therein. As such, the number of sub-layers is proportional to the number of different fluid-flow channel exit applications.

The apparatus also comprises a silicon aperture structure forming a top layer over the laminate gasket manifold. The silicon aperture structure is further adapted to connect to an ink jet system for flow of ink.

The apparatus further comprises a means for feeding ink through the channels of the laminate gasket manifold and exit the alignment apertures of the silicon aperture structure. The means for feeding ink through the channels of the gasket manifold is housed in a mounting block, which comprises a metal such as stainless steel, a ceramic such as zirconium oxide, or a glass such as Pyrex or quartz. Thus, the mounting block is attached to an ink reservoir for flow through the laminate gasket manifold.

Technical advantages of the present invention include photofabrication of the manifold which leaves no particulate debris, such as with laser machining, ultrasonic drilling, and other prior art fabrication techniques. Since debris and adhesive spills into the channels are eliminated, no cleaning of the manifold sub-assembly is required.

Other technical advantages include the use of polyimide which is a compliant material and which permits bonding material together with different thermal expansions, such as stainless steel and silicon. Thus, the stiffening material can be selected to closely match the silicon, with regard to its thermal expansion. That is, Invar, that has a thermal expansion which closely resembles that of silicon, can be used instead of the stainless steel. The thickness of these materials can be adjusted to minimize the stress induced in the silicon from the bonding operation. Still another advantage is that the thickness of the stiffening material can be adjusted to provide a given flexibility necessary for other applications.

BRIEF DESCRIPTION OF THE DRAWINGS

For a more complete understanding of the present invention, including its features and advantages, reference is made to the following detailed description of the invention, taken in conjunction with the accompanying drawings of which.

Corresponding numerals and symbols in the figures refer to corresponding parts in the detailed description unless otherwise indicated.

DETAILED DESCRIPTION OF THE INVENTION

While the making and using of various embodiments of the present invention are discussed in detail below, it should be appreciated that the present invention provides many applicable inventive concepts which can be embodied in a wide variety of specific contexts. The specific embodiments discussed herein are merely illustrative of specific ways to make and use the invention, and do not delimit the scope or application of the invention.

Figure 1:
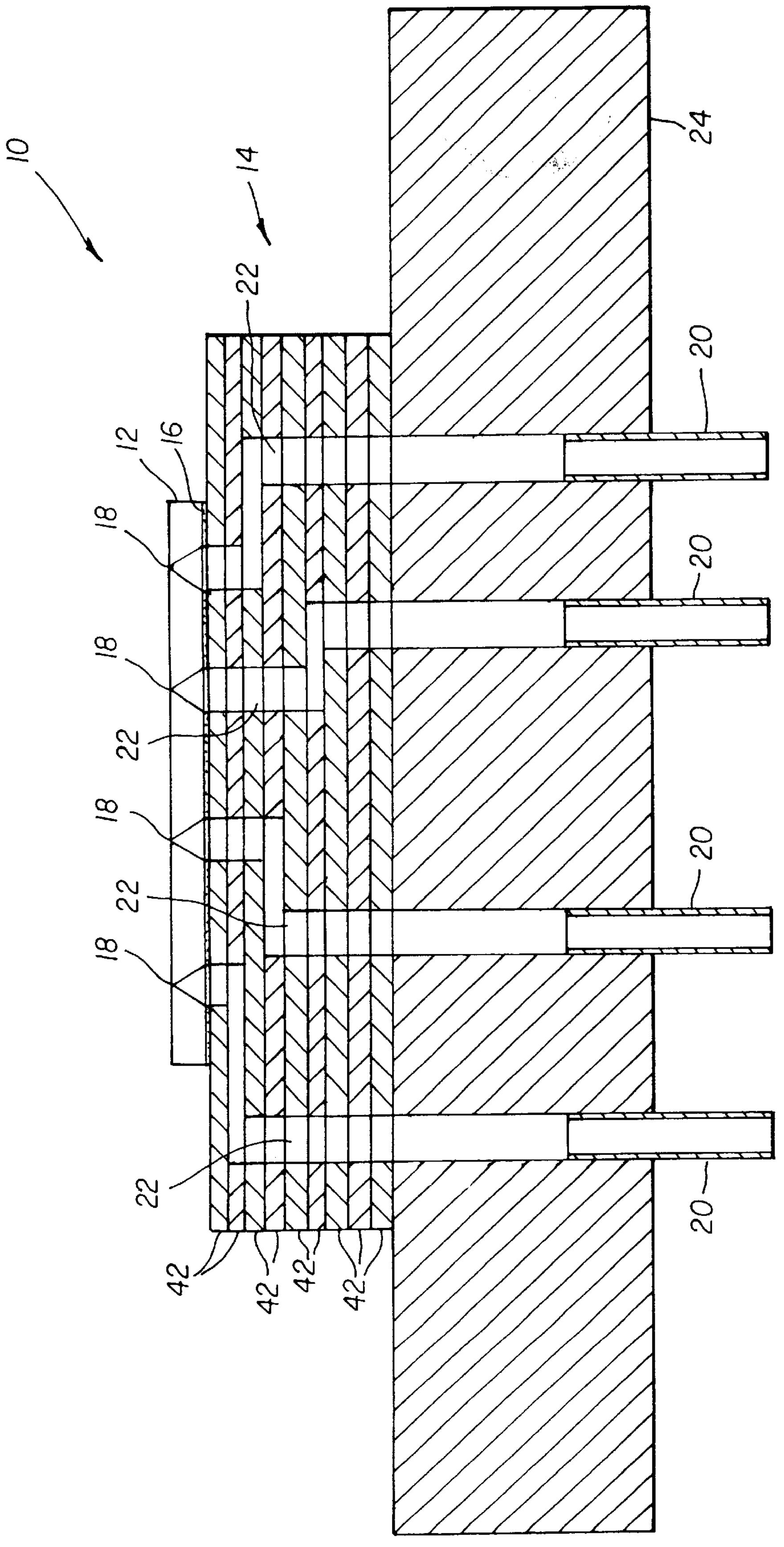
FIG. 1 is a diagram illustrating a bi-directional fluid, gas and/or vacuum flow system, in accordance with a preferred embodiment of the present invention.

To better understand the invention, reference is made to FIG. 1, wherein a diagram illustrating a bi-directional fluid, gas and/or vacuum flow system in accordance with a preferred embodiment of the present invention is shown and denoted generally as 10. Flow system 10 includes a laminate gasket manifold 14 containing a plurality of bi-directional fluid-flow channels 22 therein. The laminate gasket manifold 14 consists of laminate sub-layers 42 which are bonded and cured to form the manifold sub-assembly 14 as discussed below in reference to FIG. 3. In general, the same bonding material, or thin gasket laminate 16, is used to attach a silicon aperture structure 12 to the laminate gasket assembly 14. For ink jet printer systems, the silicon aperture structure 12, or silicon die, has a width on the order of a few millimeters. The silicon aperture structure 12 comprises a plurality of alignment apertures 18 or "nozzles" designed to constrain the ink flow via the channels 22. Those skilled in the art will appreciate that the figures referred to herein are not drawn to scale and have been enlarged in order to illustrate the major aspects of the flow system 10. A scaled drawing would not show the fine detail necessary to portray and understand the present invention.

During fabrication, the laminate gasket manifold 14 is bonded via a die bonder in between the silicon aperture structure 12 and a substrate, or mounting block 24. The mounting block 24 may comprise a metal such as stainless steel, a ceramic such as zirconium oxide, or a glass such as Pyrex or quartz. The mounting block 24 houses a means for receiving and transmitting ink, or other fluids through the inlet/outlet tubes 20 and into the bi-directional fluid-flow channels 22 of the laminate gasket manifold 14. In operation, fluid (i.e., ink) or gas exits the alignment apertures 18 of the silicon aperture structure 12. Extending from the mounting block 24 are ink inlet/outlet tubes 20 which connect to an ink reservoir (not shown) for fluid flow to the laminate gasket manifold 14.

The laminate gasket manifold 14 may also be referred to as a manifold sub-assembly, or ink manifold depending on the fluid-flow application in which it is used. Typically, the ink inlet/outlet tubes 20 are on the order of a few millimeters wide with the width of the silicon aperture structure 12, which are approximately the same as the width of the inlet/outlet tubes 20. In one embodiment, the alignment apertures 18 are on the order of 0.01 to 0.02 millimeters in diameter. The flow system 10 must attach the ink inlet/outlet tubes 20 (a few millimeters in diameter) to the micron ink jet alignment apertures (0.01 to 0.02 millimeters in diameter).

Figure 2:
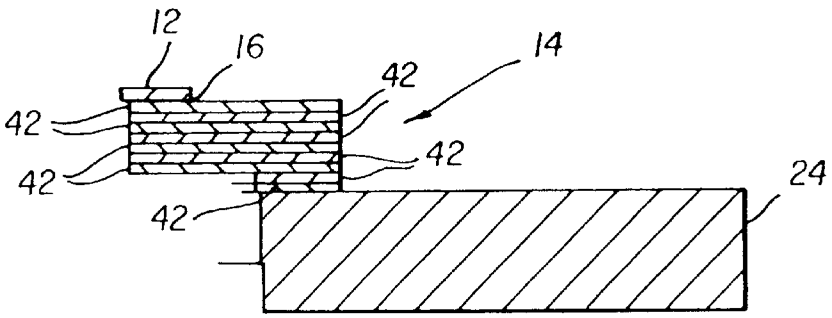
FIG. 2 depicts a close-up view of the laminate gasket manifold, in accordance with a preferred embodiment of the present invention.

FIG. 2 depicts a close-up sectional view of the flow system 10 in accordance with a preferred embodiment of the present invention. As previously discussed, the manifold sub-assembly, or laminate gasket manifold 14 is bonded to the silicon aperture structure 12 on one side, using a thin gasket laminate 16, and to the stainless steel mounting block 24, on the other side forming the flow system 10. This bonding process is performed using a die bonder where the laminate gasket manifold 14 and the additional parts (i.e., silicon aperture structure 12 and mounting block 24) to be bonded together are applied pressure and heated at 160 degrees C. for approximately five minutes. Once the silicon aperture structure 12 and the mounting block 24 have adhered to both sides of the laminate gasket manifold 14, the entire flow system 10 can then undergo a post bake at 160 degrees C. for one hour utilizing a static pressure, such as dead weight, in order to press the flow system 10 together. This, in turn, results in a complete cross-link of the bonding material on the laminate sub-layers 42.

The mounting block 24 provides a means for receiving and transmitting ink through the channels 22 of the laminate gasket manifold 14 via an ink reservoir (not shown). In this way, the laminate gasket manifold 14 functions as a gasket by maintaining ink flow within the channels 22 without flowing between the laminate sub-layers 42, as depicted in FIG. 3.

Figure 3:
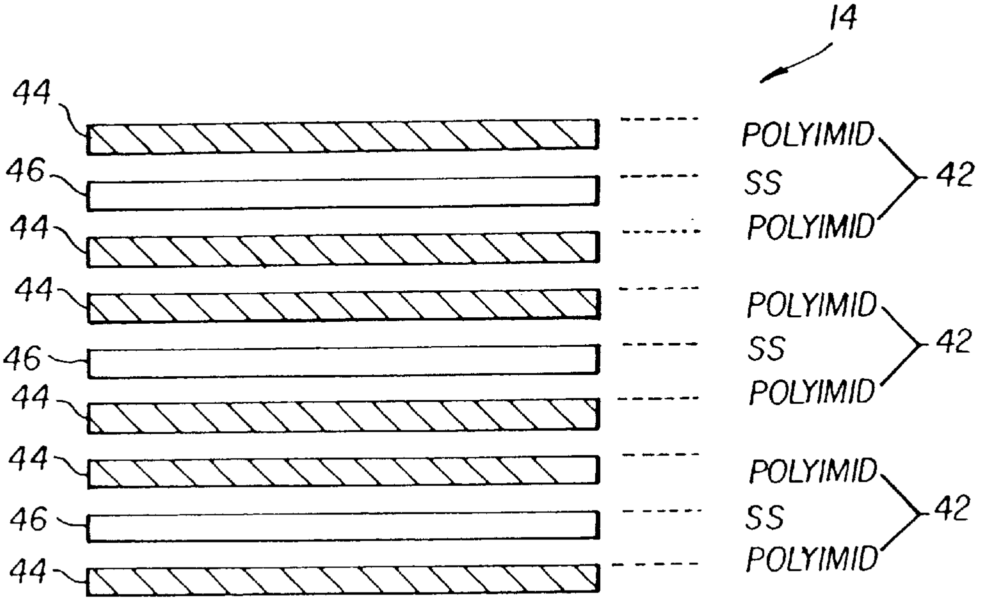
FIG. 3 shows the laminate sub-layers, in accordance with a preferred embodiment of the present invention.

As shown in FIG. 3, the laminate gasket manifold 14 comprises one or more laminate sub-layers 42. Each laminate sub-layer 42 includes a stainless steel layer 46 and two polyimide dry film layers 44. With reference to FIG. 3, nine layers, or three laminate sub-layers 42 are shown although the number may vary from one manifold 14 to another according to the flow system application.

In forming the manifold 14, photoimagable polyimide dry film resist layers 44 are applied to stiffening elements, such as stainless steel, Invar or copper layers 46. This is done on both sides of the stainless steel layers 46 so as to form a three-part sub-layer (e.g., polyimide, stainless steel, polyimide). The polyimide, however, can also be applied to only one side of a stiffening element. Each laminate sub-layer 42 is then stacked in an aligned manner. Heat and pressure are then applied via a vacuum laminator, therefore tacking the sub-layers 42 to each other to form a gasket or manifold. Only sufficient heat, approximately 70 to 75 degrees C., is used for 10 to 30 seconds to insure adhesion between layers 42. This, however, is not enough to filly cross-link the bonding material, or polyimide dry film layers 44.

The lamination process can also be performed on an array of layers 42 tabbed together. Registration pins (not shown) are then used to align the layers 42, while a vacuum laminator or a standard printed circuit board lamination press (not shown) is used for the lamination process. A thin sheet of Teflon is used between the anvils of the press and the polyimide to prevent the parts from bonding to the anvils of the lamination press. This provides a simple cost effective fabrication process for making a large number of manifolds in a single operation. The discrete manifolds are removed from the array by simply breaking the tabs between the parts.

After the lamination process, the laminate gasket manifold 14 can be bonded to additional parts, such as between a substrate, or mounting block 24 providing fluid, gas, and/or vacuum inlets and a structure, such as a silicon aperture structure 12. Together, the laminate gasket manifold 14, the silicon aperture structure 12, and the mounting block 24 form the flow system 10. In bonding all parts to the laminate gasket manifold 14, heat and pressure are applied at 160 degrees C. for approximately five minutes in order to adhere the mounting block 24 to one side of the laminate gasket manifold 14, and the silicon aperture structure 12 to the other side. Following the bonding process via a die bonder, the flow system 10 is then cured at 160 degrees C. for one hour utilizing static pressure, such as a dead weight, in order to press the flow system 10 together. Thus, the curing process results in a complete cross-link of the bonding material, or polyimide dry film layers 44.

As such, the polyimide dry film layers 44 act as a resist prior to curing, as well as an adhesive in bonding the laminate sub-layers 42 during the curing process. The fact that the polyimide dry film layers 44 are used to form the laminate gasket manifold 14 means that spill of adhesive into the fluid-flow channels 22 is eliminated. Thus, the need for cleaning is eliminated.

Figure 4:
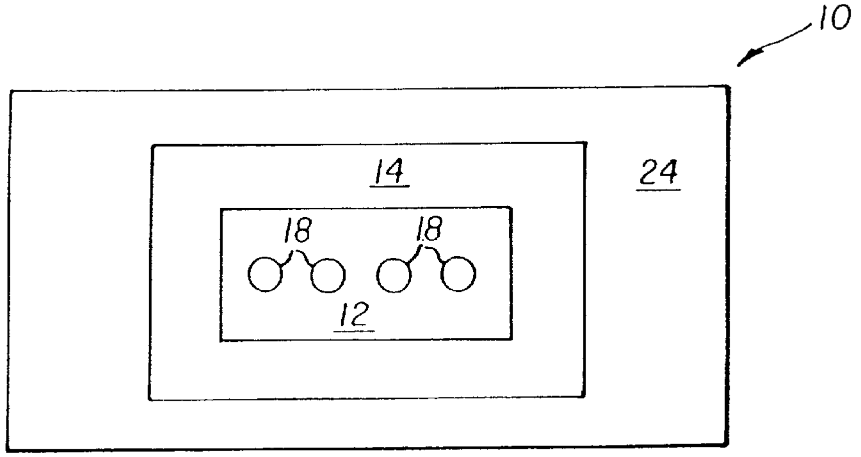
FIG. 4 is a diagram illustrating the top view of one embodiment of the present invention.

FIG. 4 is a diagram illustrating the top view of the flow system 10 according to one embodiment of the invention. The three main sections of the flow system 10 include the mounting block 24, or substrate, the laminate gasket manifold 14 and the silicon aperture structure 12. The silicon aperture structure 12 is bonded to the top layer of the manifold sub-assembly 14 utilizing a thin gasket laminate 16, or a polyimide dry film layer 44, aligned via the alignment apertures 18 which form channels 22 etched into each sub-layer 42. The alignment apertures 18 may also be referred to as exit applications as they provide a route for the ink flow from the ink jet inlets 20 to a print head attached to the silicon aperture structure 12. Alignment apertures 18 are designed to control ink flow and vary in number. In one embodiment, the number of alignment apertures 18 may depend on the number of ink colors provided. For example, FIG. 4 shows four alignment apertures 18 on the flow system 10. In one application, flow system 10 would be adapted to utilize a four-color ink jet print head that consists of one monolithic silicon die with one or more arrays of nozzles for each different color. In yet another embodiment, alignment apertures 18 may vary in number, depending on their application with regard to the flow of fluid, gas and/or vacuum. As such, alignment apertures 18 may range in number from one to several hundred.

The bonding process is accomplished by utilizing a die bonder (not shown) designed for bonding silicon chips to packages or circuit boards. A die bonder is well known in the industry to align die to the substrate 24 comprising a laminate and to apply heat and pressure to bond the parts together. With regard to the present invention, pressure and heat at 160 degrees C. for five minutes is sufficient to bond the parts together. Furthermore, a post bake at 160 degrees C. for one hour in an oven is required to fully cross-link the polyimide dry film layers 44. This increases the bond strength and makes the material inert to the ink. During the post bake, pressure is applied to the flow system 10 with a static pressure, such as a dead weight. This bake could be performed in the die bonder, but the extended bake time of one hour drastically reduces the throughput of the bonder. If, however, the laminate gasket manifold 14 is not to be used to bond other parts together, undergoing a post bake by heating the laminate sub-assembly 14 under pressure at 160 degrees C. for one hour will fully cross-link the bonding material.

Figure 5:
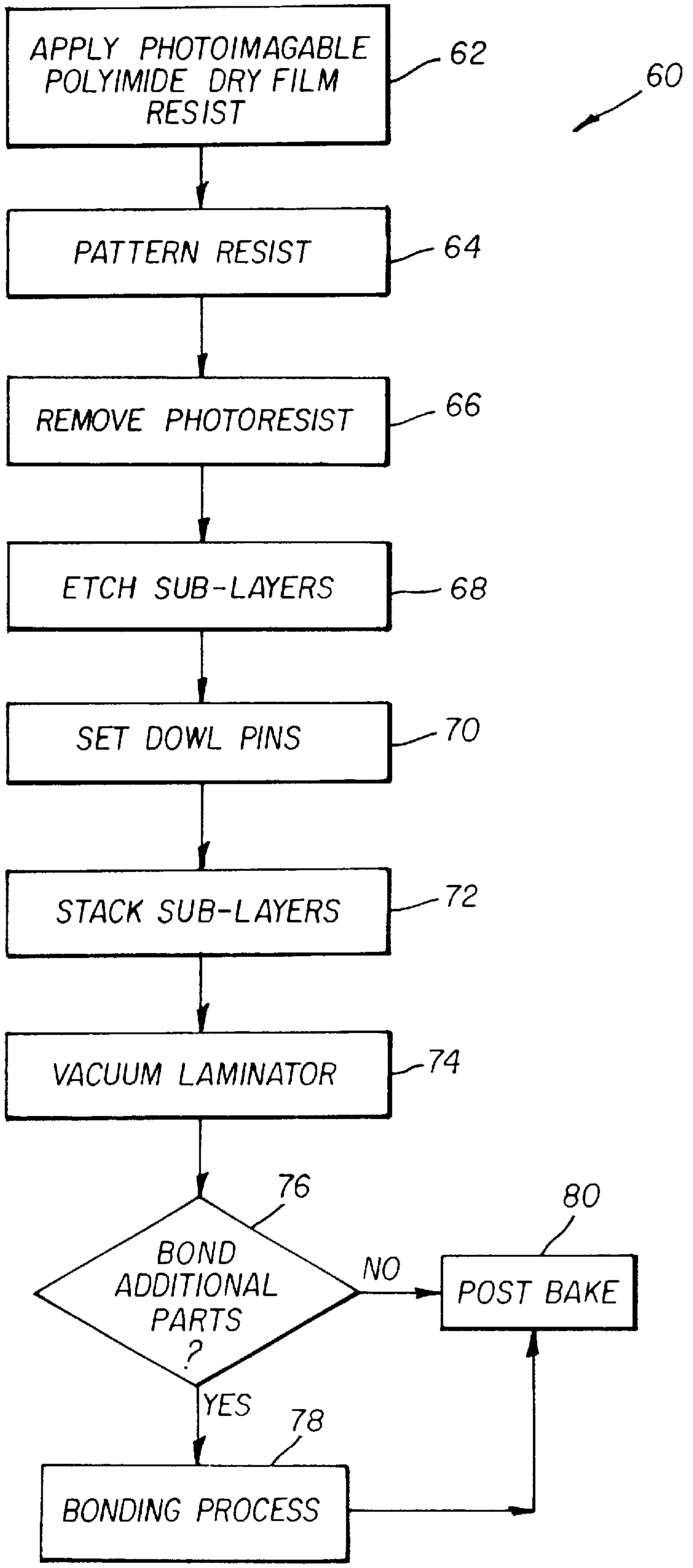
FIG. 5 is a high-level logic flow diagram illustrating process steps for implementing the method and system of the present invention, in accordance with a preferred embodiment.

FIG. 5 is a flow diagram illustrating the process steps, denoted generally as 60, for fabricating a flow system 10 according to one embodiment of the present invention. Process 60 begins at step 62 wherein a photoimagable polyimide dry film resist layer 44 is applied to a layer 46 which acts as a stiffening element. Step 62 is performed so that a layer of polyimide dry film 44 surrounds each layer of the stiffening element 46, such as stainless steel, Invar or copper, to provide adhesion to other polyimide layers 44 in the laminate gasket manifold 14. Thus, polyimide is desirable due to its adhesion and simplicity of use. Furthermore, stainless steel shim stock is a material that may be used being that it is readily available and chemically etches easily. The dry film material is applied as a laminate on both sides of the steel, therefore forming a laminate sub-layer 42. A laminator may be used which allows for the stainless steel stock to be fed in while fusing polyimide to both sides of the layer forming a lamination. Using a photo tool, an image is then created and developed on both sides of each laminate sub-layer 42 during registration so that the image on the backside is aligned to the image on the front side. This is performed in order to prepare the stainless steel for etching.

Openings in the dry film are patterned at step 64 on both sides by using a pre-registered or pre-aligned photomask. The pattern is then defined by removing the photoresist at step 66 from the selected patterned area of the laminate sub-layers to prepare for etching. The stainless steel is etched at step 68 from between the openings. That is, the laminate sub-layers 42 are etched to form alignment apertures 18 therein. The etching process is performed separately on the laminate sub-layers 42 utilizing an array format. Dry film photoresists, in particular dry film solder masks, are formulated to adhere to the substrate without the addition of other materials, such as an adhesive (e.g., epoxy).

Once the alignment apertures 18 have been etched out at step 68, dowl pins are then set at step 70 in the alignment apertures 18 utilizing a flex-mass board. The pins are used to keep the openings aligned while stacking the laminate sub-layers 42 at step 72. That is, the laminated sub-layers 42 are stacked in an aligned manner to register the openings to one another. These openings, when stacked in an aligned manner, define the channels 22 for bi-directional fluid flow through the laminate gasket manifold 14 to the exit applications of the silicon aperture structure 12.

After the laminate sub-layers 42 have been stacked at step 72, heat and pressure are then applied to the stack at step 74 via a vacuum laminator, whereby the laminate sub-layers 42 are bonded together to form a laminate gasket manifold 14. Only sufficient heat, approximately 70 to 75 degrees C., is applied for a period ranging from 10 to 30 seconds in order to insure adhesion between the sub-layers 42. This, however, is not enough to fully cross-link the bonding material. The bonding material, or polyimide dry film, functions as a laminate for the stainless steel layers 46, as well as an adhesive to bond the laminate sub-layers 42 together. The bonding of all these layers, thus, forms a laminate gasket manifold 14 that prevents fluid, or ink from leaking between the layers. As such, the fluid flow is controlled so as to continue its route from an ink reservoir entering the ink inlets, through the laminate gasket manifold 14 and out the exit alignment apertures 18 to a print head therein attached.

The laminate gasket manifold 14 is then in a state to bond additional parts at step 76 to either or both sides. If bonding additional parts is desired at step 76, then a die bonder is used at step 78 to accomplish this task. As such, the laminate gasket manifold 14 can be bonded to additional parts, such as between a substrate, or mounting block 24, providing fluid, gas and/or vacuum inlets and a structure, such as a silicon aperture structure 12. The mounting block 24 can comprise a metal such as stainless steel, a ceramic such as zirconium oxide, or a glass such as Pyrex or quartz. The laminate gasket manifold 14 is first aligned with the nozzles 18, or orifices of the silicon aperture structure 12. As such, a precision die bonder can be used to accurately align the structures to the laminate gasket manifold 14. Once all parts have been aligned, heat and pressure via a die bonder are then applied at 160 degrees C. for approximately five minutes in order to adhere the substrate, or mounting block 24, to one side of the laminate gasket manifold 14 and the silicon aperture structure 12 to the other side. The laminate gasket manifold 14 together with additional parts, thus, forms a fluid, gas and/or vacuum flow system 10.

To fully cross-link the bonding material, a post bake at step 80, or curing process, is administered in an oven. As such, heat at 160 degrees C. for one hour is applied with a static pressure, such as a dead weight, that presses the flow system 10 together during the cross-linking process. However, if the laminate gasket manifold 14 is not to be used to bond other parts together at step 76, then heating the laminate sub-assembly 14 via a post bake at step 80 at 160 degrees C. for one hour will fully cross-link the bonding material.

As such, this process describes a fluid, gas and/or vacuum flow system 10 comprising a laminate gasket manifold 14, which is photofabricated and leaves no particle debris, as do the methods of laser machining, or ultrasonic drilling. Therefore, the part is clean after processing and needs no further cleaning. Furthermore, no adhesives are necessary to assemble the structure. In the preferred embodiment, the polyimide dry film functions as an adhesive, which does not compare to other conventional adhesives that wick into ink channels and crack the silicon die because they are thin and weak.

While this invention has been described with a reference to illustrative embodiments, this description is not intended to be construed in a limiting sense. Various modifications and combinations of the illustrative embodiments, as well as other embodiments of the invention, will be apparent to persons skilled in the art upon reference to the description. It is, therefore, intended that the appended claims encompass any such modifications or embodiments.

PARTS LIST

10 . . . fluid, gas and/or vacuum flow system, or flow system
12 . . . silicon aperture structure
14 . . . laminate gasket manifold or sub-assembly
16 . . . thin gasket laminate
18 . . . alignment apertures, or "nozzles"
20 . . . ink inlet/outlet tubes
22 . . . bi-directional fluid-flow channels
24 . . . mounting block, or substrate
42 . . . laminate sub-layer
44 . . . photoimagable polyimide dry film resist layer
46 . . . stainless steel layer

What is claimed is:

1. A method of fabricating a fluid, gas and/or vacuum flow system, said system having a laminate gasket manifold containing a plurality of bi-directional fluid-flow channels therein, the method comprising the steps of:

applying a photoimagable polyimide dry film resist to one or more stiffening elements in order to form laminate sub-layers;

patterning said resist to form a plurality of openings therein;

selectively etching said laminate sub-layers to form alignment apertures therein;

stacking the resist-coated sub-layers such that the alignment apertures therein are aligned to each other, respectively, to form bi-directional fluid-flow channels; and applying heat and pressure to the stack, whereby the laminate sub-layers are bonded together to form a laminate gasket manifold.

2. The method according to claim 1 wherein said step of applying a photoimagable polyimide dry film resist is performed on one or both sides of said stiffening elements, said stiffening elements chosen from the group consisting of: stainless steel, Invar or copper.

3. The method according to claim 1 wherein said step of applying a photoimagable polyimide dry film resist further comprises the step of creating an image developed on both sides of each laminate sub-layer during registration.

4. The method according to claim 1 wherein said patterning step is performed on both sides of said laminate sub-layers utilizing a pre-registered or pre-aligned photomask.

5. The method according to claim 1 wherein said step of patterning is followed by the step of defining the pattern by removing the photoresist from the selected patterned area of said laminate sub-layers to prepare for etching.

6. The method according to claim 1 wherein said etching step is performed separately on said laminate sub-layers utilizing an array format.

7. The method according to claim 1 wherein said step of etching said laminate sub-layers to form alignment apertures is followed by the step of setting pins in said alignment apertures utilizing a flex-mass board to align the layers together.

8. The method according to claim 1 wherein said step of applying heat and pressure further includes the step of heating said laminate gasket manifold at 70–75 degrees C. in a vacuum laminator for 10 to 30 seconds in order to tack said laminate sub-layers together, said laminate gasket manifold via said bonding material resulting in a not fully cross-linked state.

9. The method according to claim 8 wherein said heating step is followed by the step of curing said laminate gasket manifold at 160 degrees C. for one hour utilizing a static pressure, such as a dead weight, in order to press said laminate gasket manifold comprising said laminate sub-layers together during the curing process, said curing process resulting in a complete cross-link of said bonding material.

10. The method according to claim 8 wherein said heating step is followed by the step of bonding said laminate gasket manifold to additional parts, such as between a substrate providing fluid, gas or vacuum inlets and a structure, such as a silicon aperture structure, said laminate gasket manifold together with said additional parts further forming said fluid, gas and/or vacuum flow system.

11. The method according to claim 10 wherein said bonding step is preceded by the step of aligning the orifices of said additional parts to the alignment apertures of said laminate gasket manifold, thereby extending said bi-directional flow channels.

12. The method according to claim 10 wherein said bonding step is followed by the step of applying heat and pressure to said flow system at 160 degrees C. for approximately five minutes, whereby said heat and pressure is applied to adhere said substrate to one side of said laminate gasket manifold and said silicon aperture structure to the other side of said laminate gasket manifold.

13. The method according to claim 12 wherein said step of applying heat and pressure is followed by the step of curing said flow system at 160 degrees C. for one hour utilizing a static pressure, such as a dead weight, in order to press said flow system together during the curing process, said process resulting in a complete cross-link of said bonding material.

* * * * *